United States Patent
Habitz et al.

(10) Patent No.: US 8,448,110 B2
(45) Date of Patent: May 21, 2013

(54) METHOD TO REDUCE DELAY VARIATION BY SENSITIVITY CANCELLATION

(75) Inventors: Peter A. Habitz, Hinesburg, VT (US); Eric A. Foreman, Fairfax, VT (US); Gustavo E. Tellez, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 12/625,139

(22) Filed: Nov. 24, 2009

(65) Prior Publication Data

US 2011/0126163 A1    May 26, 2011

(51) Int. Cl.
*G06F 17/50* (2006.01)
*G06F 9/455* (2006.01)

(52) U.S. Cl.
USPC ........... 716/108; 716/111; 716/113; 716/122; 716/123; 716/132; 716/134

(58) Field of Classification Search
None
See application file for complete search history.

(56) References Cited

U.S. PATENT DOCUMENTS

| | | | | |
|---|---|---|---|---|
| 5,751,593 A * | 5/1998 | Pullela et al. | ................. | 716/113 |
| 5,787,008 A * | 7/1998 | Pullela et al. | .................... | 703/19 |
| 5,903,471 A * | 5/1999 | Pullela et al. | ................. | 716/108 |
| 7,401,307 B2 * | 7/2008 | Foreman et al. | .............. | 716/113 |
| 7,418,689 B2 * | 8/2008 | Habitz et al. | ................... | 716/130 |
| 7,444,608 B2 * | 10/2008 | Foreman et al. | .............. | 716/113 |
| 7,474,999 B2 * | 1/2009 | Scheffer | .......................... | 703/14 |
| 7,555,740 B2 * | 6/2009 | Buck et al. | ..................... | 716/134 |
| 7,650,580 B2 * | 1/2010 | Kucukcakar et al. | ......... | 716/100 |
| 7,716,616 B2 * | 5/2010 | Foreman et al. | .............. | 716/113 |
| 7,844,932 B2 * | 11/2010 | Buck et al. | ..................... | 716/123 |
| 7,870,525 B2 * | 1/2011 | Foreman et al. | .............. | 716/113 |
| 7,937,256 B2 * | 5/2011 | Tseng et al. | ..................... | 703/14 |
| 7,962,874 B2 * | 6/2011 | Foreman et al. | .............. | 716/113 |
| 2005/0251771 A1 * | 11/2005 | Robles | ............................. | 716/5 |
| 2006/0101361 A1 * | 5/2006 | Foreman et al. | .................. | 716/6 |
| 2008/0235217 A1 * | 9/2008 | Sharma et al. | ..................... | 707/5 |
| 2009/0019411 A1 * | 1/2009 | Chandra et al. | ................... | 716/9 |
| 2009/0235217 A1 * | 9/2009 | Buck et al. | ......................... | 716/6 |
| 2010/0293512 A1 * | 11/2010 | Buck et al. | ........................ | 716/2 |

\* cited by examiner

*Primary Examiner* — Annette M. Thompson
(74) *Attorney, Agent, or Firm* — Gibb & Riley, LLC

(57) ABSTRACT

A method receives an initial circuit design. The circuit design includes at least one path having at least one beginning point comprising a source, at least one ending point comprising a sink, and one or more circuit elements between the source and the sink. The method evaluates timing performance parameter sensitivities to manufacturing variations of each of the elements to identify how much each element will increase or decrease the timing performance parameter of the path for each change in each manufacturing variable associated with manufacturing the elements. Further, the method alters the elements within the path until elements that produce positive changes to the timing performance parameter for a given manufacturing variable change approximately equals (in magnitude) elements that produce negative changes to the timing performance parameter for the given manufacturing variable change, to produce an altered circuit design.

24 Claims, 5 Drawing Sheets

METHOD TO REDUCE DELAY VARIATION BY SENSITIVITY CANCELLATION

BACKGROUND

The present invention relates to integrated circuit design methodologies, and more specifically, to a methodology that evaluates timing performance parameter sensitivities to manufacturing variations of each of the elements within a path to identify how much each element will increase or decrease the timing performance parameter of the path for each change in each manufacturing variable associated with manufacturing the elements.

Manufacturing process variation is increasing as geometries reduce in size. Statistical Static Timing Analysis can model variations and account for it in timing tests. Reducing variation through early design changes can improve design robustness.

SUMMARY

According to one embodiment of the present invention, a method is provided that receives an initial circuit design into a computerized device. The circuit design includes at least one path having at least one beginning point comprising a source, at least one ending point comprising a sink, and one or more circuit elements between the source and the sink. The method evaluates timing performance parameter sensitivities to manufacturing variations of each of the elements to identify how much each element will increase or decrease the timing performance parameter of the path for each change in each manufacturing variable associated with manufacturing the elements, again using the computerized device. Further, the method alters the elements within the path until elements that produce positive changes to the timing performance parameter for a given manufacturing variable change approximately equals (in magnitude) elements that produce negative changes to the timing performance parameter for the given manufacturing variable change, to produce an altered circuit design using the computerized device.

According to another embodiment of the present invention, a method is provided that receives an initial circuit design into a computerized device. The circuit design includes at least one path having at least one beginning point comprising a source, at least one ending point comprising a sink, and one or more circuit elements between the source and the sink. The method evaluates resistance and capacitance sensitivities to manufacturing variations of each of the elements to identify how much each element will increase or decrease the resistance and capacitance of the path for each change in each manufacturing variable associated with manufacturing the elements, again using the computerized device. Further, the method alters the elements within the path until elements that produce positive changes to the resistance and capacitance for a given manufacturing variable change approximately equals (in magnitude) elements that produce negative changes to the resistance and capacitance for the given manufacturing variable change, to produce an altered circuit design using the computerized device.

According to a further embodiment of the present invention, a method is provided that receives an initial circuit design into a computerized device. The circuit design includes at least one path having at least one beginning point comprising a source, at least one ending point comprising a sink, and one or more circuit elements between the source and the sink. The method evaluates temperature based timing characteristics sensitivities to manufacturing variations of each of the elements to identify how much each element will increase or decrease the temperature based timing characteristics of the path for each change in each manufacturing variable associated with manufacturing the elements, again using the computerized device. Further, the method alters the elements within the path until elements that produce positive changes to the temperature based timing characteristics for a given manufacturing variable change approximately equals (in magnitude) elements that produce negative changes to the temperature based timing characteristics for the given manufacturing variable change, to produce an altered circuit design using the computerized device.

According to an additional embodiment of the present invention, a computer program product comprising a computer readable storage medium having computer readable program code embodied therewith is configured to perform a method that receives an initial circuit design. The circuit design includes at least one path having at least one beginning point comprising a source, at least one ending point comprising a sink, and one or more circuit elements between the source and the sink. The method evaluates timing performance parameter sensitivities to manufacturing variations of each of the elements to identify how much each element will increase or decrease the timing performance parameter of the path for each change in each manufacturing variable associated with manufacturing the elements. Further, the method alters the elements within the path until elements that produce positive changes to the timing performance parameter for a given manufacturing variable change approximately equals (in magnitude) elements that produce negative changes to the timing performance parameter for the given manufacturing variable change, to produce an altered circuit design.

DETAILED DESCRIPTION

The embodiments herein identify blocks/design elements for which sensitivities to the same source of variations are in the opposite direction, combine the blocks so that the path has minimal variation to this parameter, and optimize the design so that sensitivities to the source of variation cancel along a path for a timing test.

With the embodiments herein, each metal layer is processed independently, and resistance (R) and capacitance (C) of different layers are uncorrelated. Within each layer R and C are anti-correlated (depending on same geometry). An increased R means reduced C and R variation is larger the C variation. A single layer RC delay tolerance is tight and grows with smaller C load. Multi-layer RC has independently varying segments per layer giving huge RC tolerance.

Resistance at the source of a net dominates, and capacitance dominates at the sink of the net. Relative tolerances per segment can be added or totaled using residual sum of squares (RSS). Multiple net segments are on the same layer track and, with embodiments herein, are placed in a balanced manner in the net to reduce RC tolerance.

Figure 1:
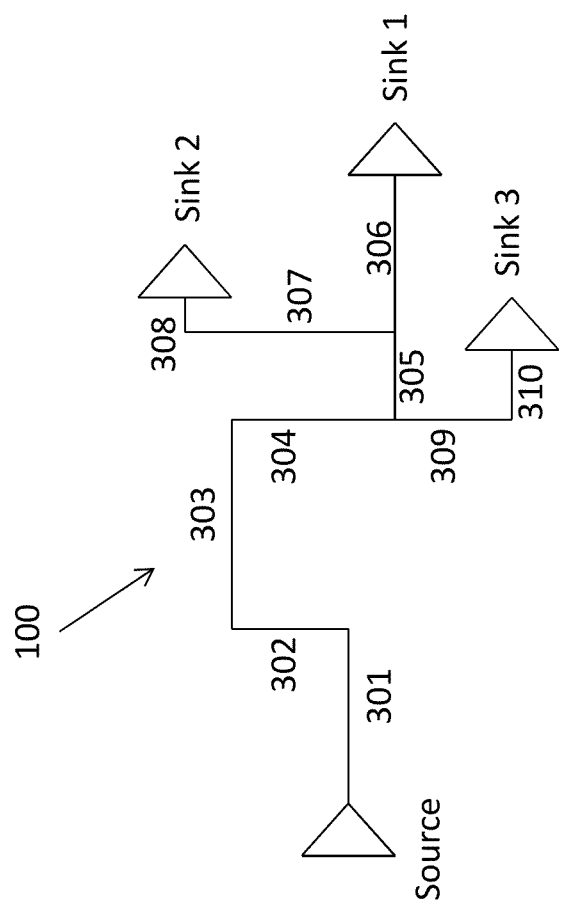
FIG. 1 is a schematic diagram of a circuit that includes a source, multiple sinks, and multiple paths between the source and sinks.

As shown in FIG. 1, a net 300 is built by conductive (e.g., metal) segments $\{i, i=101 \ldots M\}$. A branch of this net stretches from source segment 301 to sink segment N. There are several sinks (Sink 1-Sink 3) on this net 300. The delay from the source through the various segments 301-310 to each sink is unique.

One example of a method that determines RC is Elmore RC delay calculation. With the Elmore RC delay calculation, a delay component of segment i is its resistance multiplied with the sum of all capacitances downstream from i to the sink and is represented in the following formulation:

$$RC = \sum_{i=1}^{N} R_i \sum_{j=i}^{N_i} C_j$$

for the sample RC to sink1:
# of resistive segments: N=6;
# of down stream caps per res segment:
$N_1=10; N_2=10; N_3=10; N_4=10;$
$N_5=8; N_6=6.$ The Elmore delay from source to sink 1 is the sum of all delay components of the segments connecting sink 1 with the source.

With respect to RC tolerance, the following formulation can be used:

$$\frac{\partial RC}{\partial q} = \frac{\partial Rp}{\partial q} \sum_{j=p}^{N_p} Cj + \frac{\partial Cp}{\partial q} \sum_{i=1}^{P} Ri.$$

This equation gives the sensitivity of a wire segment p on level q to a geometry variation of level q. For the total RC sensitivity to level q variation, all sensitivities of segments p have to be added. RC components not on level q do not vary with level q variations.
Where:
$l_i$=length of segment i on level q $$R_i = (R_{ib} + R_{iw})\frac{1}{2}; R_i \approx R_{inom}; r_q = R_i/l_i$$

$$\frac{\partial Ri}{\partial q} = (R_{ib} - R_{iw})\frac{1}{6} = l_i * \frac{\partial r_q}{\partial q}$$

$$C_i = (C_{ib} + C_{iw})\frac{1}{2}; C_i \approx C_{inom}; c_q = C_i/l_i$$

$$\frac{\partial Ci}{\partial q} = (C_{ib} - C_{iw})\frac{1}{6} = l_i * \frac{\partial c_q}{\partial q}$$

$$\frac{\partial c_q}{\partial q} \leq -\frac{\partial r_q}{\partial q}.$$

At the global routing, without set environment, for minimum wire type, $$\frac{\partial c_q}{\partial q} \text{ and } \frac{\partial r_q}{\partial q}$$

have a fixed value per level.

This allows the calculation of sensitivity of RC to a single segment p on level q. Where segment p is the only segment on level q, the sensitivity to Rp*upstream cap+sensitivity to Cp*downstream resistance. The total RC tolerance is the statistical average of the RC sensitivities to each layer, $$\sqrt{\sum_q \left(\frac{\partial RC}{\partial q}\right)^2}$$

to minimize this number is the optimization challenge.

The global capacitance sensitivities are average numbers for an average wire environment. They scale with the length of the wire segment which is under control of the global router. As cap and resistance of the same level vary in opposite direction, the length of the segments on each layer and the choice of the layer for the segment placement can be optimized to minimize the total RC tolerance.

With respect to sensitivity of Rp and Cp to geometry variations of level q, the resistance sensitivity is asymmetric and the mean approximates the nom. This difference is small on chip level analysis. On a given level, the sensitivity scales with segment length. Further, the capacitance sensitivity is more symmetric. Resistance sensitivity is larger and in opposite direction from the capacitance sensitivity.

Router value function for several segments p on level q $$\frac{\partial RC}{\partial q} = \frac{\partial c_q}{\partial q} \sum_{p \in q} l_p \sum_{i=1}^{P} Ri + \frac{\partial r_q}{\partial q} \sum_{p \in q} l_p \sum_{j=p}^{N_p} Cj$$

These value functions per layer can be further combined to a total value function for all layers using the statistical averaging of the independent layer variation:

$$\sqrt{\sum_q (\partial RC/\partial q)^2}.$$

Level dependent sensitivity of the resistance and capacitance is available from technology models out of the difference between process corners. The other parts of the RC sensitivity are nominal length dependent resistance and capacitance estimates out of the technology models and average layer density assumptions for the wire environment. All elements of the formula are available during global routing and their resulting value can be used as value function for routing optimization. During global routing, when the level distribution per routing grid is assigned, and segment length determined by the number of routing grids in the same direction, this sensitivity function can be minimized.

For this step the value function for the wire delay tolerance is calculated. Then, wire delay tolerance as function of the length of each segment can be calculated and minimized by changing the segment length. A reduction of the segment length on layer q will require a new segment on layer q at a different place of the net or on another layer. These optimization sets can be iterated until the value function is minimal considering the accuracy of the segment sensitivity and environment assumption. The optimization process should stop when the value function is smaller than a target percentage of the delay Further, a limit should be set to the length of a segment. Too many small segments will increase the number of vias used and hurt resistance tolerance and can hurt manufacturability. The optimization process should therefore also include an average segment length target. As an example: when replacing a long rectangular route on two adjacent layers by a zigzag route with shorter wire segments on the same layers, the Total RC sensitivity can be reduced by almost an order of magnitude.

Thus, as shown above, circuits can balance circuits for resistance and capacitance changes in opposite direction to produce interconnect delay tolerance reduction. In another embodiment, temperature variations can be balanced. Increasing temperature can make some cells faster and some cells slower. On a given path these effects can be optimized to create a path delay with very small temperature sensitivity.

More specifically, with respect to temperature dependence and inversion, threshold voltage and carrier mobility decrease with increasing temperature. Further, a lower threshold voltage increases drain current and a lower mobility decreases the current. Thus, drain current is dependent on these two competing characteristics and can be represented by the following formulation:

$$\sum_{i}^{Path} \frac{\partial Delay}{\partial Temp} Block_i \approx 0.$$

Figure 2:
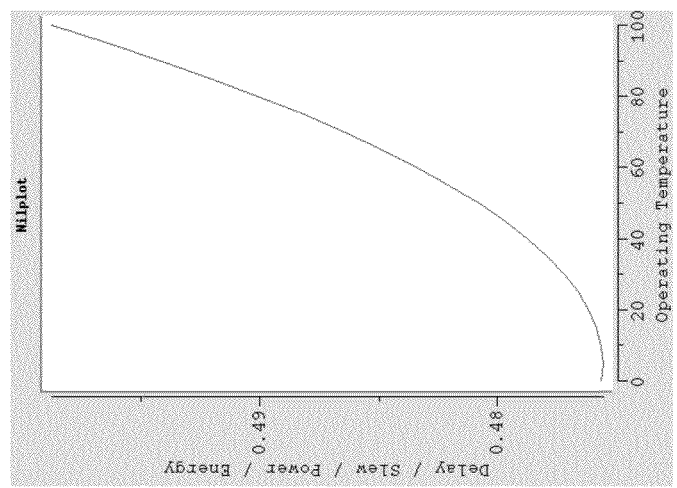
FIG. 2 is a graph illustrating changes in delay relative to operating temperature in accordance with an embodiment of the invention.
Figure 3:
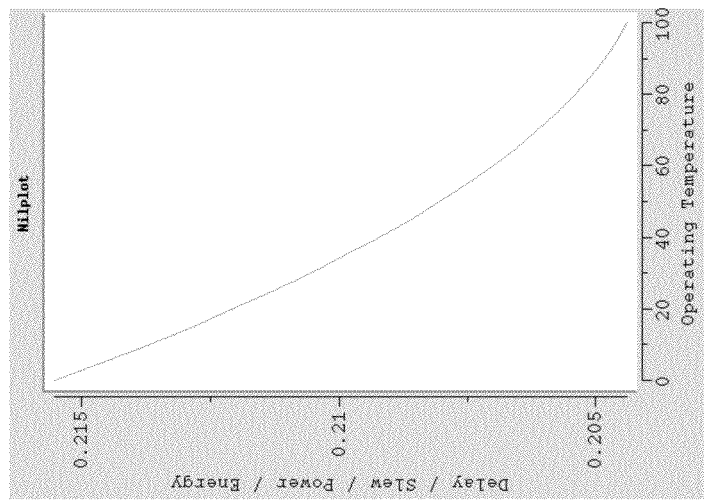
FIG. 3 is a graph illustrating changes in delay relative to operating temperature in accordance with an embodiment of the invention.
Figure 4:
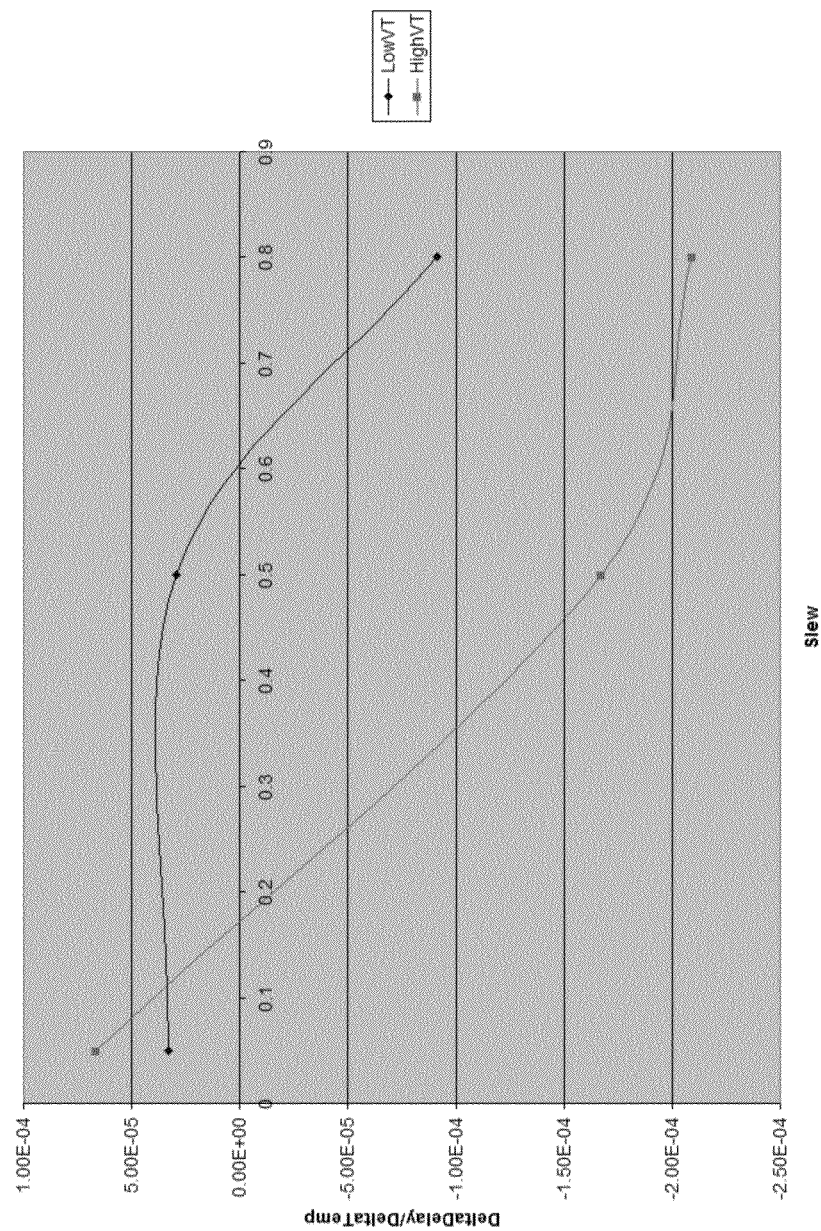
FIG. 4 is a graph illustrating changes in timing delay and temperature relative to slew in accordance with an embodiment of the invention.

This embodiment reduces temperature sensitivity by selecting and placing cells in a path. More specifically, this embodiment balances the threshold voltage cell type within each path considering load/slew to minimize temperature sensitivity. This is shown in FIGS. 2-4. FIG. 2 is a chart illustrating increasing delay for increasing operating temperature for low threshold voltage load cell types. FIG. 3 is a chart illustrating decreasing delay for increasing operating temperature for high threshold voltage load cell types. FIG. 4 shows how the slew, the shape of the output wave function varies with temperature. For two different cell types. Choosing the alternative cell type along a logic path allows one to cancel the temperature sensitivities and make the path delay relative independent of temperature changes Therefore, the embodiments herein provide methods to reduce design sensitivity to process variation through tolerance cancellation such that delay components are identified in circuit and interconnect models, process sensitivity correlation is identified, and a delay function is created to minimize process variation using process sensitivities along a given path.

Figure 5:
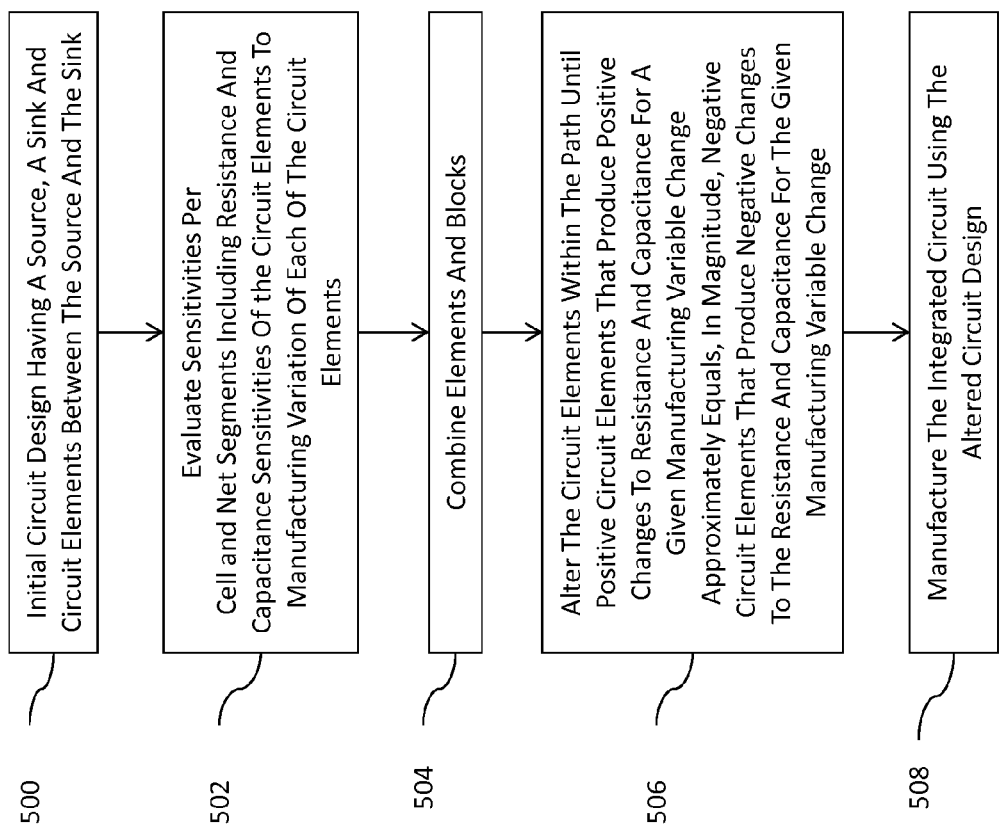
FIG. 5 is a flowchart illustrating embodiments herein.

These processes are also shown in flowchart form in FIG. 5. More specifically, in item 500, the embodiments herein begin with an initial circuit design which can be received into a computerized device. The circuit design includes at least one path having at least one beginning point comprising a source, at least one ending point comprising a sink, and one or more circuit elements between the source and the sink. A similar type of circuit is illustrated in FIG. 1 and discussed above. Each of these elements comprises one or more physical integrated circuit devices such as transistors, capacitors, conductive wiring, etc.

In item 502, the embodiments herein evaluate timing performance parameter sensitivities to manufacturing variations of each of the elements using, for example, the methodologies discussed above, as well as other methodologies whether currently known or developed in the future. These timing performance parameters sensitivities can include resistance/capacitance, temperature based timing sensitivities, etc.

More specifically, the processing in item 502 identifies how much each element will increase or decrease the timing performance parameter of the path for each change in each manufacturing variable that is associated with manufacturing the elements. Again this can be done using the computerized device.

The manufacturing variations comprise differences that occur between different production runs and differences that occur within the same production run, using the same circuit design and the same manufacturing processes. Manufacturing variations can occur because of minor environmental or tooling differences between different production runs, minor environmental differences within different locations of various chamber-type tools, and the different processing which different locations of a wafer can receive. Manufacturing variables or variations can include conductor thickness, insulator thickness, doping concentration, feature size, etc.

In item 504, the elements can be combined into blocks and/or blocks of elements can be grouped so that the path has minimal variation to a given parameter. Every timing test is on a path basis. The embodiments herein check the slack, the difference between clock and data arrival at the latch which then stores the timed data. The sensitivity of the path slack to a process variation accumulates cell and net sensitivities along the path. During the optimization process, described here, the slack sensitivities should be minimal.

To optimize the path slack the embodiments herein check the contributions of the path sensitivities from the cell and wire segment sensitivities. Then the embodiments herein combine the elements whose sensitivities to a given parameter are in opposite directions (and cancel each other). The embodiments herein also combine the elements whose sensitivities can be made to go in opposite directions.

One additional aspect of step 504 is that a cell is often shared by many different paths. Changes in the cell therefore impact several slack tests. The selection of the cell for sensitivity optimization should therefore concentrate on the most critical paths, with the smallest timing margin.

This concern is also valid in a net optimization. A sensitivity optimization of a RC delay to a given sink point should be focused on the sink pin of the most critical paths.

Further, in item 506, the method optimizes the design so that sensitivities to the source of variation cancel along a path for a timing test by altering the elements within the path. More specifically, this process alters the elements until those elements that produce positive changes to the timing performance parameter for a given manufacturing variable change approximately equals (in magnitude) those elements that produce negative changes to the timing performance parameter for the given manufacturing variable change.

Therefore, with the process in item 506, every potential manufacturing variable is evaluated separately for each element (or block or group of elements). Thus, the embodiments herein determine whether the change in a single manufacturing variable will increase or decrease the timing delay of the element, increase or decrease the resistance or capacitances of the element, increase or decrease operating temperature of the element, etc. This process is then repeated for each different manufacturing variable.

This allows each of the elements (or block or group of the elements) to be characterized according to a specific manufacturing variable, such as oxide thickness. Therefore, elements that increase timing delay when oxide thickness increases, can be classified as "positive" elements, and elements that decrease resistance when oxide thickness increases can be classified as "negative" elements. For a given manufacturing variable (the increase of oxide thickness) the positive elements for resistance within a given path can be offset with negative elements.

Stated more broadly, elements that increase timing delay, resistance, capacitances, operating temperature, etc., can be classified as "positive" elements with respect to that specific manufacturing variable. Similarly, ones that decrease timing delay, resistance, capacitances, operating temperature, etc., can be classified as "negative" elements with respect to that specific manufacturing variable.

Therefore, for a given manufacturing variable, the positive elements for timing delay, resistance, capacitances, or operating temperature within the path can be offset with negative elements. This allows the embodiments herein to balance timing delay, balance resistance, balance capacitance, balance operating temperature, etc., for a specific manufacturing variable. In other words, the embodiments herein compensate for manufacturing variations that may be within acceptable tolerances by utilizing elements within the path that will react in opposite manners to the same manufacturing variation. Therefore, if the specific manufacturing variation does occur to a specific path, the complimentary elements within that path will react in opposite manners so that, as a whole, the path will not see significant variation in a performance parameter, such as timing delay.

This alteration of the initial circuit can include the removal and substitution of various elements within the path. In addition, the sensitivities to manufacturing variations can change depending upon the geometric positions of the elements relative to the source and the sink. For example, if an element is placed closer to the source, it may tend to be more sensitive toward increasing resistance for various manufacturing changes. To the contrary, if the same element is positioned closer to the sink, it may tend to be more sensitive toward increasing capacitances for the same manufacturing changes. Therefore, with embodiments herein, the alteration of the elements performed in item 506 can also include altering the positions of the elements relative to the source and the sink, by placing the elements on different layers, by zigzagging the wiring before it reaches the element, etc.

This process in item 506 produces an altered circuit design using the computerized device. The altered circuit design provides the same function as the initial circuit design. In item 508, the embodiments herein physically manufacture the altered circuit design using tools operatively connected to the computerized device to transform raw materials into physical circuits that can be embodied in wafers, chips, boards, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or D-2 block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
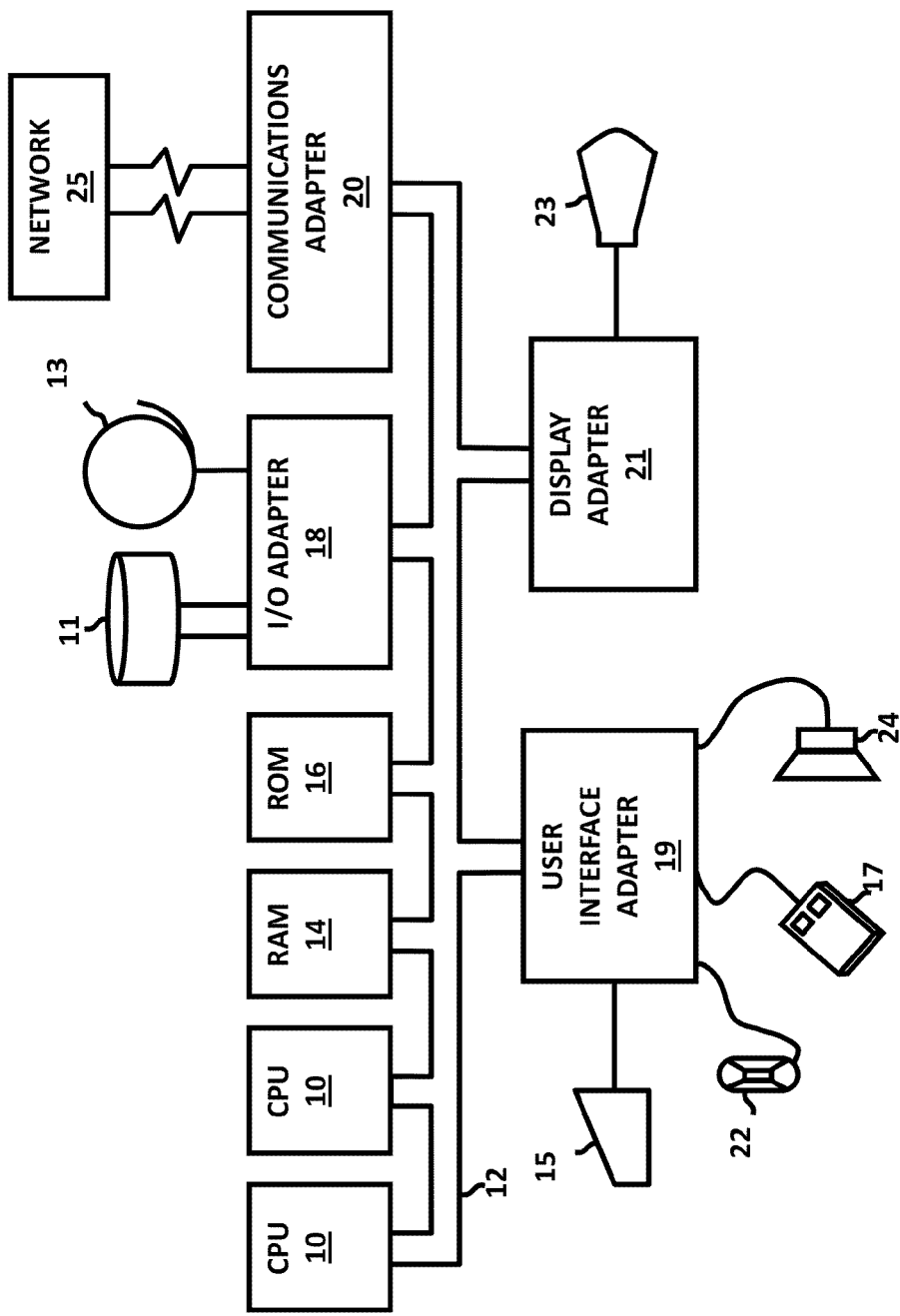
FIG. 6 is a schematic diagram of a system utilized by embodiments herein.

A representative hardware environment for practicing the embodiments of the invention is depicted in FIG. 6. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method to reduce timing performance parameter variation in an integrated circuit by design alteration, said method comprising:
   receiving an initial circuit design into a computerized device, said initial circuit design comprising a path having a source at one end, at least a sink at an opposite end, and multiple circuit elements between said source and said sink;
   evaluating, by said computerized device, timing performance parameter sensitivities of a timing performance parameter to manufacturing variations of each of said multiple circuit elements to identify how much each circuit element will increase or decrease said timing performance parameter of said path for each change in each manufacturing variable associated with manufacturing said multiple circuit elements; and
   altering, by said computerized device, said multiple circuit elements within said path until positive circuit elements of said multiple circuit elements that produce positive changes to said timing performance parameter for a given manufacturing variable change approximately equals, in magnitude, negative circuit elements of said multiple circuit elements that produce negative changes to said timing performance parameter for said given manufacturing variable change so that said negative changes to said timing performance parameter effectively cancel out said positive changes to said timing performance parameter, to produce an altered circuit design.

2. The method according to claim 1, further comprising manufacturing said integrated circuit using said altered circuit design, said manufacturing being performed with tools operatively connected to said computerized device.

3. The method according to claim 1, said timing performance parameter consisting of a measure of slack in said path.

4. The method according to claim 1, said integrated circuit having a function and said initial circuit design and said altered circuit design each being suitable designs for providing said integrated circuit having said function.

5. The method according to claim 1, further comprising:
   determining, by said computerized device, whether said sensitivities to manufacturing variations change depend upon geometric positions of said multiple circuit elements relative to said source and said sink; and when said sensitivities to manufacturing variations change depend upon said geometric positions of said multiple circuit elements relative to said source and said sink, performing said altering of said multiple circuit elements by altering positions of said multiple circuit elements relative to said source and said sink.

6. The method according to claim 1, said altering said multiple circuit elements comprises removing and substituting various circuit elements in said path.

7. A method to reduce timing performance parameter variation in an integrated circuit by design alteration, said method comprising:
receiving an initial circuit design into a computerized device, said initial circuit design comprising a path having a source at one end, a sink at an opposite end, and multiple circuit elements between said source and said sink;
evaluating, by said computerized device, resistance and capacitance sensitivities to manufacturing variations of each of said multiple circuit elements to identify how much each circuit element will increase or decrease resistance and capacitance of said path for each change in each manufacturing variable associated with manufacturing said multiple circuit elements; and
altering, by said computerized device, said multiple circuit elements within said path until positive circuit elements of said multiple circuit elements that produce positive changes to said resistance and capacitance for a given manufacturing variable change approximately equals, in magnitude, negative circuit elements of said multiple circuit elements that produce negative changes to said resistance and capacitance for said given manufacturing variable change so that said negative changes to said resistance and capacitance effectively cancel out said positive changes to said resistance and capacitance, to produce an altered circuit design.

8. The method according to claim 7, further comprising manufacturing said integrated circuit using said altered circuit design, said manufacturing being performed with tools operatively connected to said computerized device.

9. The method according to claim 7, said manufacturing variations consisting of differences that occur in said multiple circuit elements between different production runs when manufacturing said integrated circuit using said initial circuit design and differences that occur in said multiple circuit elements within a same production run when manufacturing said integrated circuit using said initial circuit design.

10. The method according to claim 7, said integrated circuit providing a function and said initial circuit design and said altered circuit design each being suitable designs for providing said integrated circuit having said.

11. The method according to claim 7, further comprising:
determining, by said computerized device, whether said sensitivities to manufacturing variations change depend upon geometric positions of said multiple circuit elements relative to said source and said sink, and
when said sensitivities to manufacturing variations change depend upon said geometric positions of said multiple circuit elements relative to said source and said sink, performing said altering of said multiple elements by altering positions of said multiple circuit elements relative to said source and said sink.

12. The method according to claim 7, said altering said multiple circuit elements comprising removing and substituting various circuit elements in said path.

13. A method to reduce timing performance parameter variation in an integrated circuit by design alteration, said method comprising:
receiving an initial circuit design into a computerized device, said initial circuit design comprising a path having a source at one end, a sink at an opposite end, and multiple circuit elements between said source and said sink;
evaluating, by said computerized device, temperature based timing sensitivities to manufacturing variations of each of said multiple circuit elements to identify how much each circuit element will increase or decrease temperature based timing characteristics of said path for each change in each manufacturing variable associated with manufacturing said multiple circuit elements; and
altering, by said computerized device, said multiple circuit elements within said path until positive circuit elements of said multiple circuit elements that produce positive changes to said temperature based timing characteristics for a given manufacturing variable change approximately equals, in magnitude, negative circuit elements of said multiple circuit elements that produce negative changes to said temperature based timing characteristics for said given manufacturing variable change so that said negative changes to said temperature based timing characteristics effectively cancel out said positive changes to said temperature based timing characteristics, to produce an altered circuit design.

14. The method according to claim 13, further comprising manufacturing said integrated circuit using said altered circuit design, said manufacturing being performed with tools operatively connected to said computerized device.

15. The method according to claim 13, said manufacturing variations consisting of differences that occur in said multiple circuit elements between different production runs when manufacturing said integrated circuit using said initial circuit design and differences that occur in said multiple circuit elements within a same production run when manufacturing said integrated circuit using said initial circuit design.

16. The method according to claim 13, said integrated circuit providing a function and said initial circuit design and said altered circuit design each being suitable designs for providing said integrated circuit having said function.

17. The method according to claim 13, further comprising:
determining, by said computerized device, whether said sensitivities to manufacturing variations change depend upon geometric positions of said multiple circuit elements relative to said source and said sink, and
when said sensitivities to manufacturing variations change depend upon said geometric positions of said multiple circuit elements relative to said source and said sink, performing said altering of said multiple circuit elements by altering positions of said multiple circuit elements relative to said source and said sink.

18. The method according to claim 13, said altering said multiple circuit elements comprising removing and substituting various circuit elements in said path.

19. A computer readable storage medium having computer readable program code embodied therewith, said computer readable program code being configured to perform, when executed, a method to reduce timing performance parameter variation in an integrated circuit by design alternation, said method comprising:
receiving an initial circuit design, said initial circuit design comprising a path having a source at one end, a sink at an opposite end, and multiple circuit elements between said source and said sink;

evaluating timing performance parameter sensitivities of a timing performance parameter to manufacturing variations of each of said multiple circuit elements to identify how much each circuit element will increase or decrease said timing performance parameter of said path for each change in each manufacturing variable associated with manufacturing said multiple circuit elements; and altering said multiple circuit elements within said path until a first subset of said multiple circuit elements that produce positive changes to said timing performance parameter for a given manufacturing variable change approximately equals, in magnitude, a second subset of said multiple circuit elements that produce negative changes to said timing performance parameter for said given manufacturing variable change so that said negative changes to said timing performance parameter effectively cancel out said positive changes to said timing performance parameter, to produce an altered circuit design.

20. The computer readable storage medium according to claim 19, said method further comprising manufacturing said altered circuit design.

21. The computer readable storage medium according to claim 19, said manufacturing variations consisting of differences that occur in said multiple circuit elements between different production runs when manufacturing said integrated circuit using said initial circuit design and differences that occur in said multiple circuit elements within a same production run when manufacturing said integrated circuit using said initial circuit design.

22. The computer readable storage medium according to claim 19, said integrated circuit having a function and said initial circuit design and said altered circuit design each being suitable designs for providing said integrated circuit with said function.

23. The computer readable storage medium according to claim 19, further comprising:
determining whether said sensitivities to manufacturing variations change depend upon geometric positions of said multiple circuit elements relative to said source and said sink, and when said sensitivities to manufacturing variations change depend upon said geometric positions of said multiple circuit elements relative to said source and said sink, performing said altering of said multiple circuit elements by altering positions of said multiple circuit elements relative to said source and said sink.

24. The computer readable storage medium according to claim 19, said altering said multiple circuit elements comprising removing and substituting various circuit elements in said path.

* * * * *